United States Patent [19]

Greene

[11] Patent Number: 5,128,185

[45] Date of Patent: Jul. 7, 1992

[54] COPOLYETHERESTER ELASTOMER WITH POLY(1,3-PROPYLENEBIBENZOATE) HARD SEGMENT

[75] Inventor: Robin N. Greene, Rockland, Del.

[73] Assignee: E. I. Du Pont de Nemours and Company, Wilmington, Del.

[21] Appl. No.: 751,521

[22] Filed: Aug. 29, 1991

[51] Int. Cl.$^5$ .............................. B29D 22/00
[52] U.S. Cl. .................. 428/36.9; 428/364; 528/272; 528/300; 528/308
[58] Field of Search ............ 528/272, 300, 308; 428/364, 36.9

[56] References Cited

U.S. PATENT DOCUMENTS

| | | | |
|---|---|---|---|
| 3,963,802 | 6/1976 | Shih | 524/513 |
| 4,048,128 | 9/1977 | Eastman | 524/147 |
| 4,156,702 | 5/1979 | Edinger | 528/229 |
| 4,247,427 | 1/1981 | Edinger | 523/506 |
| 4,731,435 | 3/1988 | Greene et al. | 528/289 |
| 4,906,729 | 3/1990 | Greene et al. | 528/272 |
| 4,937,314 | 6/1990 | Greene | 528/272 |

*Primary Examiner*—Samuel A. Acquah

[57] ABSTRACT

A thermoplastic, segmented, copolyetherester elastomer having soft segments derived from poly(alkylene oxide) glycols and bibenzoic acid, and hard segments constituting 10–17 weight percent of the elastomer and being 95 to 100% poly(1,3-propylenebibenzoate). Melt-spun fibers of the elastomer have significantly superior elastic and set properties and are less stiff than similar elastomeric fibers having the same soft segments but with hard segments of poly(ethylenebibenzoate), poly(1,4-butylenebibenzoate) or poly(1,6-hexylenebibenzoate).

8 Claims, 2 Drawing Sheets

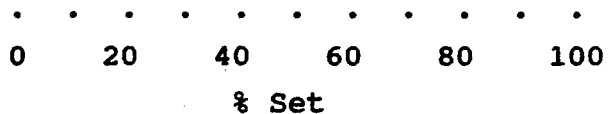

```
Hard Segments

Example 1.
    3GBB of Invention    ******  (21%)
    2GBB Comparison A    **************  (46%)
    4GBB Comparison B    *******************  (67%)
    6GBB Comparison C    ************************  (82%)
Example 2.
    3GBB of Invention    ******  (16%)
    2GBB Comparison D    **********  (31%)
    4GBB Comparison E    *************  (41%)
    6GBB Comparison F    ***************  (48%)

.  .  .  .  .  .  .  .  .  .  .
                     0    20    40    60    80    100
                                  % Set
```

FIG. 1 - % SET
(low value desired)

Hard Segments

Example 1.
- 3GBB of Invention    ****** (21%)
- 2GBB Comparison A    ************** (46%)
- 4GBB Comparison B    ******************* (67%)
- 6GBB Comparison C    ************************ (82%)

Example 2.
- 3GBB of Invention    ****** (16%)
- 2GBB Comparison D    ********** (31%)
- 4GBB Comparison E    ************* (41%)
- 6GBB Comparison F    *************** (48%)

```
 .    .    .    .    .    .    .    .    .    .    .
 0    20   40   60   80   100
```
% Set

FIG. 2 - INITIAL MODULUS
(low value desired)

Hard Segments

Example 1.
- 3GBB of Invention    ***************** (35)
- 2GBB Comparison A    ******************** (41)
- 4GBB Comparison B    ************************* (53)
- 6GBB Comparison C    *********************** (47)

Example 2.
- 3GBB of Invention    ****************** (36)
- 2GBB Comparison D    ******************** (41)
- 4GBB Comparison E    ********************** (46)
- 6GBB Comparison F    ********************* (44)

```
 .    .    .    .    .    .    .
 0         20        40        60
```
$M_i$ (after boil-off), mg/den

FIG. 3 — UNLOAD POWER
(high value desired)

Hard Segments

Example 1.
- 3GBB of Invention ************* (6.0)
- 2GBB Comparison A ******* (3.0)
- 4GBB Comparison B * (0.0)
- 6GBB Comparison C * (0.0)

Example 2.
- 3GBB of Invention ***************** (8.0)
- 2GBB Comparison D ********* (4.0)
- 4GBB Comparison E * (0.1)
- 6GBB Comparison F **** (1.5)

```
  .   .   .   .   .   .   .   .
  0       4       8       12
```
Unload power at 60%, $UP_{60}$, mg/den

FIG. 4 — UNLOAD POWER
(high value desired)

Hard Segments

Example 1.
- 3GBB of Invention ****************** (8.6)
- 2GBB Comparison A *************** (7.2)
- 4GBB Comparison B * (0.0)
- 6GBB Comparison C * (0.2)

Example 2.
- 3GBB of Invention *************************** (13.0)
- 2GBB Comparison D *********************** (11.5)
- 4GBB Comparison E ************ (5.4)
- 6GBB Comparison F *********************** (11.5)

```
  .   .   .   .   .   .   .   .   .
  0       4       8       12      16
```
Unload power at 120%, $UP_{120}$, mg/den

COPOLYETHERESTER ELASTOMER WITH POLY(1,3-PROPYLENEBIBENZOATE) HARD SEGMENT

BACKGROUND OF THE INVENTION

1. Field of the Invention

This invention relates to a thermoplastic, segmented, linear copolyesterether elastomer having soft segments derived from a poly(alkylene oxide) glycol. More particularly, the invention concerns such an elastomer having poly(1,3-propylenebibenzoate) hard segments.

2. Description of the Prior Art

Various thermoplastic, linear polyetheresters elastomers have been suggested for the production of highly elastic fibers. For example, Greene et al, U.S. Pat. No. 4,906,729 and Greene, U.S. Pat. No. 4,937,314 disclose such elastomers. The elastomers are composed of long chain ester units that constitute the "soft segments" of the elastomer and short chain ester units that constitute the "hard segments" of the elastomer. Generally, the the elastomers are formed of poly(alkylene oxide) soft segments that amount to at least 70 percent of the polyetherester elastomer. U.S. Pat. No. 4,906,729 discloses elastomers with hard segments of poly(ethylene terephthalate) referred to hereinafter as "2G/T", poly(1,4-butylene terephthalate) "4G/T", poly(ethylene-2,6-naphthalenecarboxylate) "2G/2,6N" and poly(1,4-butylene-2,6-naphthalenecarboxylate) "4G/2,6N". U.S. Pat. No. 4,937,314 discloses elastomers with hard segments of poly(1,3-propylene terephthalate) "3G/T". Although the disclosed elastomers are useful for the production of very soft, highly elastic objects, elastomers of less stiffness (i.e., lower initial modulus), higher unload power, and lower set would be particularly desirable for conversion into fibers or films intended for diaper-leg elastification, into hollow tubes intended for vascular prostheses having elastic characteristics approximating those of arterial tissue, or into many other elastic objects. Accordingly, a purpose of this invention is to provide a thermoplastic linear polyetherester elastomer that can be converted into fibers or films or other shaped articles having the above-mentioned desired combination of properties.

SUMMARY OF THE INVENTION

The present invention provides an improved thermoplastic, segmented, linear copolyetherester elastomer which consists essentially of a multiplicity of recurring intralinear long-chain and short-chain ester units connected head-to-tail through ester linkages, the long-chain ester units amounting to at least 83 percent by weight of the elastomer and being represented by the structure

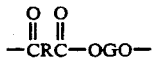     (I)

and the short-chain ester units amounting to 10 to 17 percent by weight of the elastomer and being represented by the structure

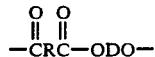     (II)

wherein

R is a divalent radical remaining after removal of carboxyl groups from a dicarboxylic acid, G is a divalent radical remaining after removal of hydroxyl groups from a poly(alkylene oxide) glycol having a carbon-to-oxygen ratio in the range of 2.5 to 4.3 and a molecular weight in the range of 1,500 to 5,000, and D is a divalent radical remaining after removal of terminal hydroxyl groups from a diol. In accordance with the improvement of the present invention, the dicarboxylic acid that provides the divalent R radicals consists essentially of bibenzoic acid, and the diol that provides the divalent D radicals consists essentially of 1,3-propanediol. Preferably, substantially all the short chain ester units are poly(1,3-propylenebibenzoate) units. The present invention also provides the copolyetherester elastomer in the form of fibers, films and tubes.

BRIEF DESCRIPTION OF THE DRAWINGS

The invention will be better understood by reference to FIGS. 1 through 4 of the drawings. The Figures are bar charts in which certain elastic properties of fibers made according to the invention with hard segments of poly(1,3-propylenebibenzoate), abbreviated hereinafter as "3G/BB", are compared to such fibers made with hard segments of poly(ethylenebibenzoate), poly(1,4-butylenebibenzoate), or poly(1,6-hexylenebibenzoate), respectively abbreviated hereinafter as "2G/BB", "4G/BB" and "6G/BB". In particular, FIG. 1 compares the percent set of the elastomeric fibers (low set is desired); FIG. 2, the initial modulus after boil-off (low value desired); and FIG. 3 and 4, the unload power (high values desired). The results of Examples 1 and 2 below provided the data for the Figures.

DETAILED DESCRIPTION OF PREFERRED EMBODIMENTS

The invention is further illustrated by the following descriptions of preferred embodiments and Examples. These are included merely for the purposes of illustration and are not intended to limit the scope of the invention, which is defined by the appended claims. In accordance with the present invention, the long chain ester units, of the structure shown in Formula I above, or "soft segments", are made by reacting bibenzoic acid with a poly(alkylene oxide) glycol or mixtures of such glycols. These long chain glycols are polymeric glycols having terminal (or as nearly terminal as possible) hydroxy groups and a molecular weight in the range of 1,500 to 5,000, preferably 2,000 to 4,000.

The long chain glycols used in the preparation of elastomers of the invention are poly(alkylene oxide) glycols having a carbon-to-oxygen ratio in the range of 2.5 to 4.3. Representative of these long chain glycols are poly(ethylene oxide) glycol, poly(1,2-propylene oxide) glycol, poly(1,3-propylene oxide) glycol, poly(tetramethylene oxide) glycol, random or block copolymers of ethylene oxide and 1,2-propylene oxide, and random or block copolymers of tetrahydrofuran with minor amounts of 3-methyltetrahydrofuran (used in proportions such that the carbon-to-oxygen mole ratio in the glycol does not exceed about 4.3). When copolymers of tetrahydrofuran with 3-methyltetrahydrofuran are employed, the 3-methyltetrahydrofuran content of the copolymer is usually in the range of 7 to 15 weight percent.

The short chain ester units, or "hard segments" are polyesters formed by the reaction of bibenzoic acid and 1,3-propanediol. When incorporated into the elastomer, the polyester forms the short chain ester repeating units (hard segments) of the structure shown in Formula II above. Usually, the hard segments of the elastomers of the invention constitute 10 to 17 percent by weight of the total elastomer. Preferably, the hard segments amount to 12 to 16%.

In accordance with the present invention, the short chain ester units consist essentially of poly(1,3-propylenebibenzoate). As used herein, "consist essentially of poly(1,3-propylenebibenzoate)" means that about 95 percent or more by weight of the short chain ester units are identical and are poly(1,3-propylenebibenzoate) units. The other short chain ester units (i.e., up to 5% other units) can be derived from any combination of other alicyclic or acyclic dihydroxy compounds and/or aromatic, aliphatic or cycloaliphatic dicarboxylic acids of low molecular weight (i.e., having a molecular weight of no more than about 300) so long as they do not detrimentally affect the properties of the resultant elastomer. Preferably, substantially all (i.e., 99–100%) of the short chain ester units are of poly(1,3-propylenebibenzoate).

The term "dicarboxylic acid" or bibenzoic acid, as used herein, includes equivalents of such acids having two functional carboxyl groups which perform substantially as do dicarboxylic acids in reaction with glycols and diols in forming copolyetherester polymers. Such equivalents include esters and ester-forming derivatives.

The elastomers described herein can be made conveniently by starting with a conventional ester interchange reaction. For example, the dimethyl ester of bibenzoic acid can be heated with a long chain glycol, an excess of 1,3-propanediol, and a small amount of branching agent, if desired, in the presence of a catalyst at a temperature in the range of 150 to 260|C. Methanol formed by the ester interchange would be distilled off. Depending on temperature, catalyst, glycol excess and particular equipment used, the reaction can be completed within a few minutes to a few hours. This procedure yields a prepolymer which can be increased in molecular weight by the procedure described below.

The prepolymers of the preceding paragraph can be prepared by other known methods of esterification or ester interchange. For example, long chain glycol can be reacted with high or low molecular weight short chain ester homopolymer or copolymer in the presence of catalyst until randomization occurs. Short chain ester homopolymer or copolymer also can be prepared by ester interchange from free acids with diol acetates. Alternatively, short chain ester polymer can be prepared from suitable acids, anhydrides, or acid chlorides, by direct esterification, for example, with diols. Other suitable processes include reaction of the acids with cyclic ethers or carbonates. The prepolymer also can be prepared by these reactions in the presence of the long chain glycol.

The prepolymer described in the preceding paragraphs, can be increased to higher molecular weights by distillation of excess 1,3-propanediol in known polycondensation methods. Additional ester interchange occurs during this polycondensation or distillation. The distillation increases the molecular weight and randomizes the arrangement of copolyester units. Best results usually are obtained when the final distillation or polycondensation is performed at a pressure below 5 mm of mercury and a temperature in the range of 220°–260° C. for less than 6 hours (e.g., 0.5 to 5 hours in the presence of conventional antioxidants). Most practical polymerization techniques rely upon ester interchange to complete the polymerization reaction. To avoid excessively long time periods at high temperatures, with attendant possible thermal degradation, a catalyst can be employed in the ester interchange reaction.

If desired, a branching agent, such as disclosed by Hoeschele, U.S. Pat. No. 4,205,158, column 3, lines 35 through 66 can be included in the polymerization mix.

Ester interchange polymerizations generally are performed in the melt without any solvent. However, inert solvents can be used to facilitate removal of volatile components from the polymerization mix. This technique is particularly useful in preparing prepolymer by direct esterification. Polycondensation of prepolymer can also be accomplished in the solid phase by heating particles of solid prepolymer in a vacuum or in a stream of inert gas to liberate and remove low molecular weight diol.

The processes described above can be performed as batch or continuous processes. The preferred method for continuous polymerization by ester interchange with a prepolymer, is an established commercial process.

Conventional additives can be incorporated into the elastomers of this invention by known techniques. Such additives include antioxidants, ultraviolet light stabilizers, inorganic fillers, pigments, and the like.

In accordance with the present invention, the weight percent of hard segment in the elastomer is in the range of 10 to 17%, preferably 12 to 16%.

The mole ratio of hard segment to soft segment generally is in the range of 0.9 to 1.2. When the ratio is below 0.9, the elastomer usually has an undesirably low tenacity and is slow to crystallize. As the ratio is increased, synthesis of homogenous material becomes increasingly difficult. Above ratio of 1.2, "biphasing" frequently occurs during polymerization and the resultant polymer contains a separate phase of high-melting oligomeric blocks of hard segment and desired properties are lost. The best balance of processability and desirable properties is obtained with elastomers of the invention having a mole ratio of hard segment to soft segment in the range of 0.9 to 1.1. The preferred ranges are used for making the polymers of the Examples below.

Test Procedures

The various characteristics and properties mentioned in the preceding discussion and in the Examples below were determined by the following test procedures.

Inherent viscosity, "IV", is determined in deciliters per gram (dL/g), in accordance with W. R. Sorenson and T. W. Campbell, "Preparative Methods of Polymer Chemistry", Interscience Publishers, 2nd Ed. (1968) p. 44. A solution of 0.5 gram of polymer in 100 ml of m-cresol at 30° C. is used. In the Examples, samples for inherent viscosity determinations were taken from the threadline initially emerging from the spinneret.

The concentration of the hard segment in the polymer is calculated by the following formula, % HS = weight percent hard segment =

-continued $$\frac{100(M_{hs})[(w_1/M_1) - (w_2/M_2)]}{(M_{hs})[(w_1/M_1) - (w_2/M_2)] + (M_{ss})(w_2/M_2)}$$

wherein
w is weight
M is molecular weight
and subscript
   hs refers to hard segment (short chain ester)
   ss refers to soft segment (long chain ester)
   1 refers to the dimethyl ester of the starting diacid and
   2 refers to the long chain glycol.

Note that the weight of the long chain glycol, as used in the formula, must have the weight of inert oligomeric cyclic ethers substracted from the total weight of the glycol. The oligomeric ethers usually amount to about zero to two weight percent.

Number average molecular weight of the glycol is determined by reacting the glycol with an excess of acetic anhydride in pyridine and then back-titrating with sodium hydroxide to measure the amount of acetic acid produced and calculating the molecular weight therefrom.

Tenacity at break, T, in grams per denier and percent elongation at break, E, are measured with an Instron Tester equipped with Series 2712 (002) Pneumatic Action Grips, in accordance with ASTM Method D 2653-72, "Standard Test Method for Breaking Load and Elongation of Elastomeric Yarns".

"Unload power", UP, in milligrams per denier is measured in accordance with the general method of ASTM D 2731-72, "Standard Test Method for Elastic Properties of Elastomeric Yarns". Three filaments, a 2-inch (2.5-cm) gauge length and a zero-to-300% elongation cycle are used for each determination. Unload power (i.e., the stress at a particular elongation) is measured after the samples have been cycled five times at a constant elongation rate of 800% per minute and then held at the 300% extension for half a minute after the fifth extension. While unloading from this last extension, the stress, or unload power, is measured at elongations of 60 and 120%, and are designated $UP_{60}$ and $UP_{120}$, respectively. The initial modulus in milligrams per denier, Mi, a measure of stiffness, and percent set also were measured by ASTM Method D 2731-72.

As reported herein, T, E and UP represent the data for best individual filaments and Mi, and % Set are the average of three determinations. Initial moduli reported below were measured after boil-off (i.e., after the filaments had been exposed to boiling water at 100° C. for 30 minutes).

EXAMPLES

The following examples illustrate the invention. The results reported herein are believed to be typical, but do not constitute all the runs performed. In the Examples, Tables and Figures, samples of the invention are identified with Arabic numerals; those with upper-case letters are comparison samples outside the invention.

For convenience, several abbreviations are employed in the examples, as follows:

| | |
|---|---|
| 2GBB | hard segment formed from ethylene glycol (2G) and bibenzoic acid (BB) |
| 3GBB | hard segment formed from 1,3-propylene glycol (3G) and bibenzoic acid (BB) |
| 4GBB | hard segment formed from 1,4-butane diol (4G) and bibenzoic acid |
| 6GBB | hard segment formed from 1,6-hexane diol (6G) and bibenzoic acid |
| BSA | Butylstannoic acid esterification catalyst |
| PO4G | poly(tetramethyleneoxide)glycol, also known as poly(tetramethylenether)glycol, or polymerized "THF". |
| THF | tetrahydrofuran |
| MeTHF | 3-methyltetrahydrofuran |
| DMBB | dimethyl bibenzoate |
| TBT | tetrabutyl titanate esterification catalyst |
| AO-330 | 1,3,5-trimethyl-2,4,6-tris[3,5-di-t-butyl-4-hydroxy-benzyl]benzene antioxidant, sold by Ethyl Corp. |
| SS | soft segment of elastomer |
| HS | hard segment of elastomer |
| HS/SS | mole ratio of hard to soft segment |
| % HS | percent hard segment (based on the total weight of elastomer) |
| MW | molecular weight of long chain glycol. |

The examples describe the production and physical properties of filaments made from elastomers of the invention having 3GBB hard segments, derived from bibenzoic acid and 1,3-propylene glycol. These are compared to similar, very closely related elastomers outside the invention having hard segments of 2GBB, 4GBB and 6GBB, derived from bibenzoic acid and ethylene glycol, 1,4-butylene glycol and 1,6-hexylene glycol, respectively. The elastomers have soft segments with molecular weight of about 1,950 and 2,000, hard segment contents of about 12 to 16% and ratios of hard-segment to soft-segment of between about 0.9 and 1.1. All filaments were drawn to provide the filaments with the lowest percent set, usually to two or three times their original length (i.e., 2X or 3X). Drawing beyond the selected draw ratio for a given sample was found to provide no significant improvement in % set. The comparison samples were made with soft segments of the same molecular weights as the samples of the invention.

EXAMPLE 1

Sample 1 of the invention and each of its three Comparison Samples A, B and C, have soft segments of PO4G of 2,000 molecular weight. The hard segment of Sample 1 is 3GBB. Comparison Samples A, B, and C have hard segments of 2GBB, 4GBB and 6GBB, respectively.

The elastomer of Sample 1, was prepared by placing the following weights of ingredients in a 300-cm³ kettle, equipped for distillation:

| | |
|---|---|
| 31.7 | grams of PO4G having a number average molecular weight of about 2000 |
| 10.0 | grams of 1,3-propylene glycol (3G) |
| 10.2 | grams of dimethyl bibenzoate (DMBB) |
| 0.15 | gram of Antioxidant 330 (manufactured by Ethyl Corporation). |
| 1.5 | cm³ of a 5 weight percent solution of tetrabutyl titanate (TNT) catalyst in 1,3-propanediol. |
| 1.0 | cm³ of a 1 weight % solution of butyl stannoic acid (BSA) catalyst in methanol |

A stainless steel stirrer, fitted with a paddle shaped to conform with the internal dimensions of the kettle, was positioned about 0.3 cm (⅛ inch) from the bottom of the kettle. Stirring was started. Then, the kettle was placed in a Woods metal bath heated to a temperature in the range of 249° to 260° C. for about 70 minutes, during which time stirring was continued and methanol distilled from the mix. The temperature was then reduced to 249° C. and the pressure on the system was then reduced to 0.17-0.15 mm of mercury over the course of about 52 minutes. Distillation was continued at the reduced pressure for about 68 minutes. The resulting viscous molten product was removed from the kettle and allowed to cool. The inherent viscosity of the product was 1.83.

General procedures of the preceding paragraph were used to prepare Comparison Samples A, B and C, except for small changes in reaction temperatures and/or ester interchange catalysts. To avoid the possibility of the rate of polymer degradation being high enough to start competing with the rate of polymerization, reaction temperatures were limited to no higher than 260° C.

The elastomers were melt spun into filaments. A cylindrical cell of 2.2-cm ($\frac{7}{8}$-inch) inside diameter and 12.7-cm (5-inch) length was employed. The cell was equipped with a hydraulically driven ram that was inserted on top of the sample. The ram had a replaceable "Teflon" tip designed to fit snugly inside the cell. An annular electric heater which surrounded the lower quarter of the cell was used for controlling cell temperature. A thermocouple inside the cell heater recorded the cell temperature. Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closest to the exit): 50, 50, 325, 50, 200, 50, 100, and 50. A compressible annular aluminum seal was fitted to the top of the "stack" of filters. Below the filters was a cylindrical passage of about 2.5-cm (1-inch) length and 0.16-cm (1/16 inch) interior diameter, the lower end of which was tapered (at an angle of 60 degrees from the vertical) to meet with an outlet final orifice measuring 0.069 cm (0.027 inch) in length and 0.023 cm (0.009 inch) in inside diameter. The spinneret temperature was controlled by a separate annular heater. Cell temperature usually was no more than about 10° C. higher than the spinneret temperature.

Elastomer samples were cut into small pieces, lightly dusted with antioxidant AO-330 and dried for 1 to 2 days at 110° C. under nitrogen in a vacuum oven. Dry pieces, weighing about 20 grams, were placed in the above-described cell, which had been preheated to a temperature of about 100° C. under a stream of dry nitrogen. A pressure of about 34,500 kPa (5,000 psig) was applied to the sample and cell. Spinneret temperatures were then raised until a filament began to extrude. Then, temperatures were raised further until the molten filament no longer exhibited melt fracture (as indicated by its ability to be attenuated 4X at a throughput of $\frac{1}{2}$ gram per minute). At that throughput, the filament sample was forwarded in succession to (a) a take-up roll rotating at 40 meters/min, on which four wraps were made, (b) a draw roll, the speed of which was increased in proportion to the desired draw ratio, and around which four wraps of filament were made, and (c) a bobbin revolving at a slightly lower speed than that of the draw roll, and upon which the filament was wound. If necessary, a finish was applied to the filament before or as it arrived at the take-up roll to prevent filament stickiness. No filaments of the invention required a finish when melt-spun at the 0.5-g/min throughput.

Selected properties of the elastomers and filaments prepared in this example are summarized below in Table I and in the bar graphs of FIGS. 1-4. The table and figures clearly demonstrate the advantages of filaments made with elastomers of the invention over the comparison samples. The filaments of the invention are stronger (i.e., of higher tenacity and higher unload powers), much softer (i.e., of unexpectedly low initial modulus after boil-off), and of much lower % set.

TABLE I

| | Example 1 | | | |
|---|---|---|---|---|
| | Sample | | | |
| HS | 1<br>3GBB | A<br>2GBB | B<br>4GBB | C<br>6GBB |
| % HS | 13.9 | 12.1 | 14.4 | 15.4 |
| HS/SS | 1.1 | 1.0 | 1.1 | 1.1 |
| T, g/den | 0.68 | 0.66 | 0.63 | 0.20 |
| E, % | 457 | 466 | 410 | 788 |
| $M_i$, mg/den | 35 | 41 | 53 | 47 |
| $UP_{120}$, mg/den | 8.6 | 7.2 | 0.0 | 0.2 |
| $UP_{60}$, mg/den | 6.0 | 3.0 | 0.0 | 0.0 |
| % Set | 21 | 46 | 67 | 82 |

EXAMPLE 2

The elastomers and filaments therefrom for Sample 2 and Comparison Samples D, E and F, of this example were prepared by the same general procedures set forth in Example 1. However, Sample 2 and each of its three Comparison Samples, have copolymer soft segments of THF/3MeTHF (93/7) of 1,966 molecular weight. Sample 2 of the invention has a hard segment of 3GBB. Comparison Samples D, E and F respectively have hard segments of 2GBB, 4GBB and 6GBB. Results, summarized below in Table II and in the bar graphs of FIGS. 1-4 again show the important advantages of employing 3GBB hard segments in accordance with the invention rather than the closely related hard segments of the comparison samples. The advantages are particularly evident in enhanced unload power and reduced % set and lower stiffness.

TABLE II

| | Example 2 | | | |
|---|---|---|---|---|
| | Sample | | | |
| HS | 2<br>3GBB | D<br>2GBB | E<br>4GBB | F<br>6GBB |
| % HS | 14.0 | 12.4 | 14.6 | 15.6 |
| HS/SS | 1.1 | 1.0 | 1.0 | 1.1 |
| T, g/den | 0.49 | 0.47 | 0.20 | 0.38 |
| E, % | 422 | 463 | 542 | 394 |
| $M_i$, mg/den | 36 | 43 | 45 | 44 |
| $UP_{120}$, mg/den | 13.0 | 11.5 | 5.4 | 11.5 |
| $UP_{60}$, mg/den | 8.0 | 4.0 | 0.1 | 1.5 |
| % Set | 16 | 31 | 41 | 48 |

I claim:

1. In a thermoplastic, segmented, linear copolyetherester elastomer which consists essentially of a multiplicity of recurring intralinear long-chain and short-chain ester units connected head-to-tail through ester linkages, the long-chain ester units amounting to at least 83 percent by weight of the elastomer and being represented by the structure

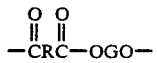

and the short-chain ester units amounting to 10 to 17 percent by weight of the elastomer and being represented by the structure

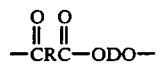

wherein
- R is a divalent radical remaining after removal of carboxyl groups from a dicarboxylic acid,
- G is a divalent radical remaining after removal of hydroxyl groups from a poly(alkylene oxide) glycol having a carbon-to-oxygen ratio in the range of 2.5 to 4.3 and a molecular weight in the range of 1,500 to 5,000, and
- D is a divalent radical remaining after removal of terminal hydroxyl groups from a diol, the improvement comprising the dicarboxylic acid consists essentially of bibenzoic acid and the diol consists essentially of 1,3-propanediol.

2. An elastomer in accordance with claim 1, wherein the short chain ester units are substantially all poly(1,3-propylenebibenzoate) units.

3. An elastomer in accordance with claim 1, wherein the poly(alkylene oxide) glycol is selected from the group consisting of the glycol of poly(ethylene oxide), poly(tetramethylene oxide) and copolymers of tetrahydrofuran and 3-methyltetrahydrofuran.

4. An elastomer in accordance with claim 1, 2 or 3 wherein the weight percent of short chain ester units is in the range of 12 to 16.

5. An elastomer in accordance with claim 3, wherein the mole ratio of short chain ester units to long chain ester units is in the range of 0.9 to 1.2.

6. An elastomer in accordance with claim 5, wherein the wherein the mole ratio is in the range of 0.9 to 1.1.

7. An elastomer in accordance with claim 3, wherein the long chain ester units are derived from a copolymer of tetrahydrofuran and 3-methyltetrahydrofuran, with the weight percent of 3-methyltetrahydrofuran in the copolymer being in the range of 7 to 15.

8. An elastomer of claim 1, 2 or 3 in the form of a fiber or film or hollow tube.

* * * * *